(12) United States Patent
Betran Palomas

(10) Patent No.: US 10,018,179 B2
(45) Date of Patent: Jul. 10, 2018

(54) WIND TURBINE BLADE

(71) Applicant: ALSTOM RENEWABLE TECHNOLOGIES WIND B.V., Breda (NL)

(72) Inventor: Jaume Betran Palomas, Sant Cugat del Valles (ES)

(73) Assignee: GE Renewable Technologies Wind B.V., Breda (NL)

( * ) Notice: Subject to any disclaimer, the term of this patent is extended or adjusted under 35 U.S.C. 154(b) by 185 days.

(21) Appl. No.: 14/911,688

(22) PCT Filed: Aug. 18, 2014

(86) PCT No.: PCT/EP2014/067550
§ 371 (c)(1),
(2) Date: Feb. 11, 2016

(87) PCT Pub. No.: WO2015/024895
PCT Pub. Date: Feb. 26, 2015

(65) Prior Publication Data
US 2016/0208782 A1 Jul. 21, 2016

(30) Foreign Application Priority Data

Aug. 19, 2013 (EP) .................................... 13382333

(51) Int. Cl.
*F03D 1/06* (2006.01)
*F03D 7/02* (2006.01)

(52) U.S. Cl.
CPC ......... *F03D 7/0224* (2013.01); *F03D 1/0675* (2013.01); *F05B 2240/31* (2013.01); *F05B 2260/78* (2013.01); *F05B 2260/964* (2013.01); *Y02E 10/721* (2013.01); *Y02E 10/723* (2013.01)

(58) Field of Classification Search
CPC ............................ F03D 1/0675; F03D 1/0683
See application file for complete search history.

(56) References Cited

U.S. PATENT DOCUMENTS

| 7,980,826 B2 * | 7/2011 | Hancock ............ B29D 99/0028 29/889.71 |
| 9,458,823 B2 * | 10/2016 | Liu ........................... F16B 2/10 |
| 2006/0133937 A1 | 6/2006 | Deleonardo et al. |
| 2011/0206529 A1 * | 8/2011 | Bell ........................ B29C 65/48 416/226 |
| 2012/0027615 A1 | 2/2012 | Irizarry-Rosado et al. |

FOREIGN PATENT DOCUMENTS

FR 2864175 A1 6/2005

OTHER PUBLICATIONS

Notification of Transmittal of the International Search Report and the Written Opinion of the International Searching Authority, or the Declaration for international patent application No. PCT/EP2014/067550, dated Sep. 5, 2014, 8 pages.

* cited by examiner

*Primary Examiner* — Justin Seabe
(74) *Attorney, Agent, or Firm* — Dority & Manning, P.A.

(57) ABSTRACT

The present wind turbine blade comprises an airfoil structure comprising an airfoil shape, an internal support structure arranged spanwise along the length of the blade within the airfoil structure, and an elastic connection joining a portion of an inner surface of the airfoil structure with a portion of the internal support structure. The airfoil structure can be passively pitched relative to the internal support structure according to aerodynamic pressure distribution at different blade locations.

8 Claims, 6 Drawing Sheets

WIND TURBINE BLADE

The present disclosure relates to wind turbine blades.

BACKGROUND

Wind turbines commonly used to supply electricity into the electrical grid generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A variable speed wind turbine may typically be controlled by varying the generator torque and the pitch angle of the blades. As a result, aerodynamic torque, rotor speed and electrical power will vary.

A common prior art control strategy of a variable speed wind turbine is described with reference to FIG. 1. In FIG. 1, the operation of a typical variable speed wind turbine is illustrated in terms of the pitch angle (β), the electrical power generated (P), the generator torque (M) and the rotational velocity of the rotor (ω), as a function of the wind speed. The curve representing the electrical power generated as a function of wind speed is typically called a power curve.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be varied so as keep the tip speed ratio λ (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:
$T = k \cdot \omega^2$, wherein k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The before described operation may be translated into a so-called power curve, such as the one shown in FIG. 1. Such a power curve may reflect the optimum operation of the wind turbine under steady-state conditions. However, in non-steady state (transient) conditions, the operation may not necessarily be optimum.

In modern variable speed wind turbines, this kind of control or variations on this idea are generally implemented. The control implemented is thus quite different from e.g. active stall and passive stall wind turbines. In active stall machines, above the nominal wind speeds, the blades are pitched so as to cause stall and thus reduce the aerodynamic torque. In passive stall machines, the blades are not rotated but instead are designed and mounted such that stall automatically occurs at higher wind speeds.

As further background, basic aerodynamic behaviour of (the blades of) a wind turbine is explained with reference to FIGS. 2a-2c.

In FIG. 2a, a profile of a wind turbine blade is depicted in operation. The forces generated by the aerodynamic profile are determined by the wind that the profile "experiences", the effective wind speed $V_e$. The effective wind speed is composed of the axial free stream wind speed $V_a$ and the tangential speed of the profile $V_t$. The tangential speed of the profile $V_t$ is determined by the instantaneous rotor speed ω and the distance to the centre of rotation of the profile, the local radius r, i.e. $V_t = \omega \cdot r$.

The axial free stream wind speed $V_a$ is directly dependent on the wind speed $V_w$, and on the speed of the wind downstream from the rotor $V_{down}$, that is $V_a = \frac{1}{2}(V_w + V_{down})$. The axial free stream wind speed may e.g. be equal to approximately two thirds of the wind speed $V_w$.

The resultant wind flow, or effective wind speed $V_e$, generates lift L and drag D on the blade. A blade may theoretically be divided in an infinite number of blade sections, each blade section having its own local radius and its own local aerodynamic profile. For any given rotor speed, the tangential speed of each blade section will depend on its distance to the rotational axis of the hub (herein referred to as local radius).

The lift generated by a blade (section) depends on the effective wind speed $V_e$, and on the angle of attack of the blade (section) α, in accordance with the following formula:

$$L = \frac{1}{2}\rho \cdot C_L V_e^2 \cdot S,$$

wherein ρ is the air density, $V_e$ is the effective wind speed, $C_L$ is the lift coefficient (dependent on the angle of attack α and on the form of the aerodynamic profile of the blade section), and S is the surface of the blade section.

Similarly, the drag D generated by a blade section can be determined in accordance with the following equation:

$$D = \frac{1}{2}\rho \cdot C_D V_e^2 \cdot S,$$

wherein $C_D$ is the drag coefficient dependent on the angle of attack α and on the form of the aerodynamic profile of the blade section.

For an entire wind turbine blade, the contribution to lift and drag of each blade section should be summed to arrive at the total drag and lift generated by the blade. The resultant wind force on a blade is represented by reference sign F in FIG. 2a. The resultant wind force may be seen to be composed of Lift (L) and drag (D), as the wind forces relatively perpendicular to the effective wind direction and in the plane of the effective wind direction. Alternatively, as explained later on, the resultant wind force may also be decomposed in a force Normal (N), i.e. perpendicular to the plane of the chord and a force in the plane of the chord C. And further alternatively, the resultant wind force may also be decomposed in a force in the plane of rotation (In) and a force perpendicular to the plane of rotation (Out).

Both the drag coefficient $C_D$ and the lift coefficient $C_L$ depend on the profile or the blade section and vary as a function of the angle of attack of the blade section. The angle of attack α may be defined as the angle between the chord line of a profile (or blade section) and the vector of the effective wind flow, see FIG. 2a.

FIG. 2b illustrates in a very general manner how the static lift coefficient and drag coefficient may vary as a function of the angle of attack of a blade section. Generally, the lift coefficient (reference sign 21) increases to a certain maximum at a so-called critical angle of attack 23. This critical angle of attack is also sometimes referred to as stall angle. The drag coefficient (reference sign 22) may generally be quite low and starts increasing in an important manner close to the critical angle of attack 23. This rapid change in aerodynamic behaviour of a profile or blade section is linked generally to the phenomenon that the aerodynamic flow around the profile (or blade section) is not able to follow the aerodynamic contour and the flow separates from the profile. The separation causes a wake of turbulent flow, which reduces the lift of a profile and increases the drag significantly.

The exact curves of the lift coefficient and drag coefficient may vary significantly in accordance with the aerodynamic profile chosen. However, in general, regardless of the aerodynamic profile chosen, a trend to increasing lift up until a critical angle of attack and also a rapid increase in drag after a critical angle of attack can be found.

In accordance with FIG. 2a, the force in the plane of the chord generated by a blade section is given by In=L·sin(α+∂)−D·cos(α+∂), wherein ∂ is the pitch angle and α is the angle of attack. The pitch angle may be defined as the angle between the rotor plane and the chord line of a profile. Integrating the in-plane distribution over the radius provides the driving torque. Similarly, the out-of-plane force is given by Out=L·cos(α+∂)+D·sin(α+∂). In FIG. 2a, a possible local twist of a blade section is disregarded.

If instead the decomposition in normal to the chord (N) and in the plane of the chord (C) is chosen, the following equations result: N=L·sin α−D·cos α and C=L·cos α+D·sin α. When the pitch angle of the blade equals zero, the In-plane loads correspond to the loads in the plane of the chord (if twist is disregarded) and similarly the out-of-plane loads substantially correspond to the loads perpendicular to the chord.

It furthermore follows from these equations that for relatively small angles of attack, the loads normal to the plane (N) are substantially equal to the lift forces (L). On the other hand, the loads in plane (C) are quite different from the drag forces (D).

In order to increase the torque generated by the rotor, the angle of attack of any blade section is preferably kept below the critical angle of attack such that lift may be higher and drag may be lower. In the before mentioned first operational range, the angles of attack of the blade sections may be relatively low. In the second operational range, the angles of attack of blade sections (or at least of a representative blade section) may be equal to or close to the angle of attack that gives the best ratio of L/D. In the third operational range, the angles of attack may be higher and closer to the critical angle(s) of attack and thus give corresponding high lift coefficients. In the supra-nominal zone of operation, as the blades are pitched, the angles of attack are reduced and are again further away from the critical angle(s) of attack.

It should be borne in mind that the angle of attack of each blade section depends on the tangential speed of the specific rotor blade section, the wind speed, the pitch angle and the local twist angle of the blade section. The local twist angle of a blade section may generally be considered constant, unless some kind of deformable blade is used. The tangential speed of the rotor blade section depends on the rotor speed (angular velocity of the rotor which is obviously the same for the whole blade and thus for each blade section) and on the distance of the blade section to the rotational axis.

For a given pitch angle, it follows that the angle of attack is determined by the tip speed ratio $$\lambda = \frac{\omega \cdot R}{V_w}.$$

From this, it follows that the torque generated by a rotor blade section may become a rather complicated function of the instantaneous tip speed ratio and the pitch angle of the blade.

The lift and drag curves schematically illustrated in FIG. 2b are "static" curves, i.e. they represent the aerodynamic behaviour of a blade section in steady-state conditions. These curves however do not apply to transient conditions. FIG. 2c schematically illustrates the lift coefficient (CO both for static and dynamic conditions (on the left hand side) and the normal coefficient (CO both for static and dynamic conditions, all as a function of the angle of attack α. It is noted that:

$$C_L = \frac{L}{\frac{1}{2}\rho \cdot C_L V_e^2 \cdot S},$$

and similarly $$C_D = \frac{D}{\frac{1}{2}\rho \cdot C_L V_e^2 \cdot S}, \quad C_N = \frac{N}{\frac{1}{2}\rho \cdot C_L V_e^2 \cdot S}, \text{ and } C_c = \frac{C}{\frac{1}{2}\rho \cdot C_L V_e^2 \cdot S}.$$

Herein $C_c$ is the "chordal coefficient".

The curves representing the static conditions are shown in interrupted lines. The dynamic behaviour of a blade section may be different in that stall does not occur until a higher angle of attack. In the example shown in FIG. 2c, under the specific dynamic conditions depicted, stall does not occur until an angle of attack of approximately 19°, whereas in dynamic conditions, stall occurs at an angle of attack of around 12°. Also, when stall occurs, the lift decreases very quickly at a very small increment of the angle of attack. After stall, in dynamic conditions, the lift coefficient is significantly lower than it would be under static conditions.

That is, if an angle of attack were infinitely slowly increased for the blade section, stall occurs at an angle of attack of around 12° and if the angle of attack is relatively quickly changed, stall occurs at approximately 19°. In reality, a plurality of different dynamic curves exist depending e.g. on the speed of change of (in this case) the angle of attack.

On the right hand side of FIG. 2c, similar static and dynamic curves are shown for $C_n$. The curves for both $C_L$ and $C_n$ are quite similar.

Dynamic conditions in which the behaviour of aerodynamic profiles of wind turbine blades may be similar to the dynamic curves of FIG. 2c may be found e.g. during a wind gust (a relatively rapid increase in wind speed), in cases of wind shear and/or wind veer (as the blade rotates, it encounters a variation of wind speed and/or wind direction respectively leading to a relatively strong variation of the angle of attack). Also, cases wherein the area swept by the blade may be divided into two very distinct layers are known. As a blade passes from one layer into another, an important variation in wind speed and direction can be experienced by the blade. Under these conditions, the aerodynamic behaviour of a section of the blades may correspond more closely to the dynamic curves then to the static curves.

Stall of blade sections is generally not desirable for the operation of modern wind turbines with a variable speed operation as previously discussed. The concepts of control by active or dynamic stall of blades are known. These are however hardly used in modern wind turbines. In modern variable speed wind turbines, the aerodynamic torque is generally limited by pitch control above nominal wind speed.

At or after stall, the aerodynamic lift decreases, whereas the drag increases. Roughly speaking, this means that particularly the loads that are "useless" for the operation of the wind turbine increase, because the loads occurring at or after stall are mainly out-of-plane loads which do not contribute to the aerodynamic torque of the rotor. However, the whole wind turbine structure including blades, rotor, nacelle and tower naturally need to withstand these loads. It is thus generally desired to avoid these useless loads by avoiding stall.

This is even more the case for stall occurring under "dynamic" conditions: the drop in lift is more serious in dynamic conditions, than in static conditions.

SUMMARY

A wind turbine blade is disclosed herein by means of which unwanted stall is avoided or at least reduced.

The present wind turbine blade comprises an airfoil structure having an airfoil shape. The blade is further provided with an internal support structure that is arranged spanwise along the length of the blade within the airfoil shape. The internal support structure may extend along the entire length of the wind turbine blade or along part of the length thereof.

The internal support structure may have a closed cross section such as a circular or polygonal shaped cross section, or it may have an open cross section, such as an I-shaped or U-shaped cross section. Other shapes are not ruled out.

The internal support structure may be continuous or it can be formed of a number of support structure sections having different mechanical characteristics. The internal support structure may have one end that is fixed or coupled to a blade root or to a blade root extender.

The airfoil shape and the internal support structure are elastically joined to each other by means of a suitable elastic connection. Specifically, this elastic connection joins a portion of an inner surface of the airfoil shape with a portion of the internal support structure. In some implementations, the elastic connection may join a portion of an inner surface of the airfoil shape with a portion of an outer surface of the internal support structure. In any case, said portion of the inner surface of the airfoil shape and said portion of the internal support structure connection are joined to each other through said elastic connection in a way that they can be passively pitched relative to each other according to aerodynamic pressure distribution at different blade locations.

In general, it is preferred that the elastic connection is placed at a location within the airfoil shape cross-section such that the aerodynamic moment around the internal support structure is zero or close to zero for low wind conditions.

The airfoil structure can thus be passively pitched relative to the internal support structure as stated above. This means that no active control of the blade is needed to achieve this effect and advantageously no sensors are required for local pitch correction of the blade. Therefore, the negative effects of stall may be reduced or avoided even when e.g. the angle of attack of the blade section increases rapidly due to wind shear or a wind gust.

In some implementations, the elastic connection may be an elastic hinge connection and may comprise a ball joint. Other mechanical arrangements for an elastic hinge connection of the inner surface of the airfoil shape with the internal support structure such as a hinge joint are not ruled out as long as the airfoil structure is allowed to be passively pitched relative to the internal support structure.

A space may be defined between the internal support structure and the airfoil structure. This space should be suitable for the passive airfoil structure to pitch relative to the internal support structure. A suitable biasing mechanism may be arranged within said space acting between the airfoil structure and the internal support structure. In some implementations, such biasing mechanism may comprise a flexible foam. Other forms of biasing mechanism are not ruled out, such as for example an elastic continuous or discontinuous anisotropic compressible foam, one or a plurality of elastomeric or spring elements such as rubber elements or springs, etc. Still in other implementations, a number of biasing mechanisms having different properties may be provided along the length of the blade in different blade sections. The mechanism advantageously further provides adequate damping properties to the blade structure so that coupling vibration phenomena can be therefore avoided.

The present wind turbine blade provided with such a local passive pitch mechanism is capable of at least reducing loads thereon while obtaining a smooth behaviour of the wind turbine rotor in operation.

Additional objects, advantages and features of examples of the wind turbine blade will become apparent to those skilled in the art upon examination of the description, or may be learned by practice thereof.

BRIEF DESCRIPTION OF THE DRAWINGS

Particular examples of the present wind turbine blade will be described in the following by way of non-limiting examples, with reference to the appended drawings, in which.

DETAILED DESCRIPTION OF EMBODIMENTS

Figure 4A:
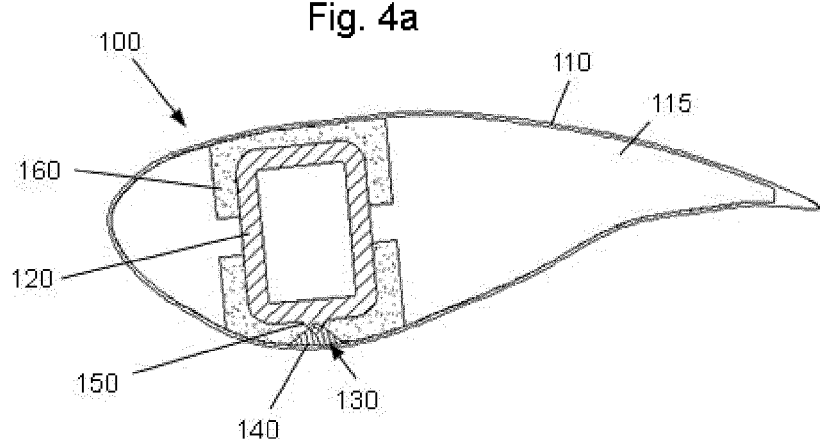
FIGS. 4a-4c show cross-sectional views of examples of the present wind turbine blade.
Figure 4B:
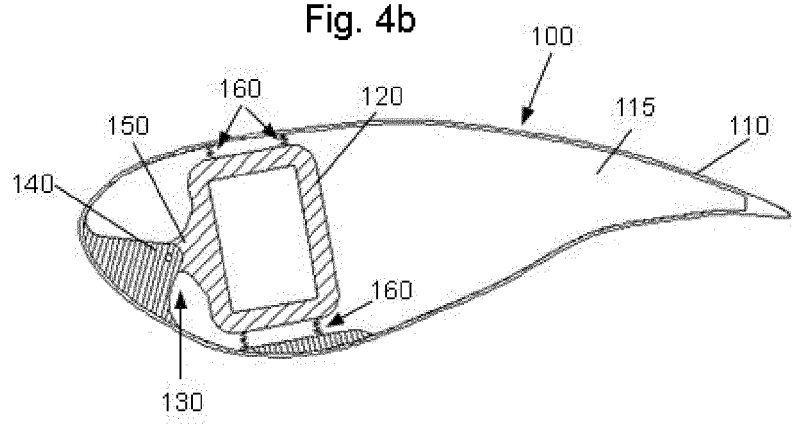
Figure 4C:
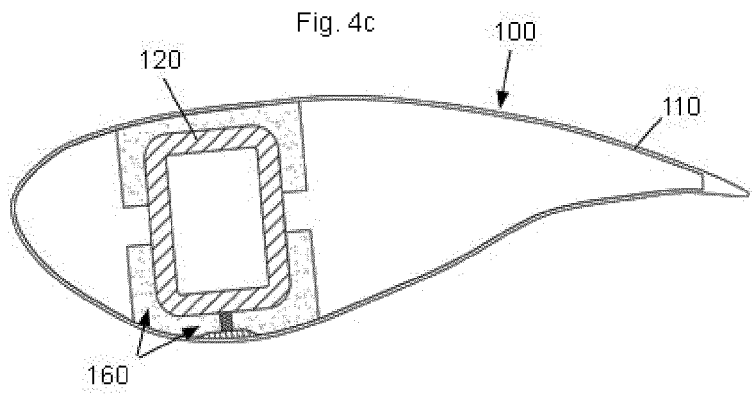

The wind turbine blade 100 shown in FIGS. 4a-4c comprises an airfoil structure 110 with an airfoil shape. In the present design, the airfoil structure 110 does not need to be a closed structure as long as an inner space 115 is enclosed. Inner space 115 is suitable for receiving an internal support structure 120 therein. The internal support structure 120 is arranged spanwise along the length of the blade 100. The elastic connection is arranged at a location within the airfoil structure 110 such that the aerodynamic moment is at least close to zero for low wind conditions.

In the examples shown, the internal support structure 120 is a longitudinal hollow beam, referred to as a spar-box, having a substantially rectangular cross-section. Other shapes in cross-section, such as circular or polygonal, may be used according to the requirements for the internal support structure, and in general it may have a closed or open cross section. Furthermore, the support structure 120 could be solid instead of hollow if required. In any case, one end of the support structure 120 is fixed to a blade root or a to blade root extender (not shown) of the wind turbine.

As shown in FIGS. 4a and 4c, the internal support structure 120 is hinged to the airfoil structure 110 through an elastic hinge connection 130.

In the example shown in FIG. 4a, the elastic connection 130 comprises a first connecting portion 140 that is fixed to or is part of a lower portion of the inner surface of the airfoil structure 110 (i.e. the inner surface of the pressure side of the airfoil), and a second connecting portion 150 that is fixed to or is part of a corresponding lower portion of the outer surface of the internal support structure 120. The first and second connecting portions 140, 150 of the elastic connection 130 are hinged to each other such that the first portion 140 can pivot with respect to the second portion 150. In this way, the internal support structure 120 and the airfoil structure 110 can be passively pitched relative to each other according to aerodynamic pressure distribution present at different locations of the blade 100. The hinge in this case may be a ball joint.

In the example shown in FIG. 4b, the first connecting portion 140 of the elastic connection 130 is fixed to or is part of the inner surface of the airfoil structure 110 that substantially corresponds the blade leading edge, while the second connecting portion 150 is fixed to or is part of a forward portion of the outer surface of the internal support structure 120. The first and second connecting portions 140, 150 are hinged to each other such that the first portion 140 can pivot with respect to the second portion 150. In this way, the internal support structure 120 and the airfoil structure 110 can be passively pitched relative to each other according to aerodynamic pressure distribution present at different locations of the blade 100. Also in this case, the hinge may be a ball joint.

Figure 1:
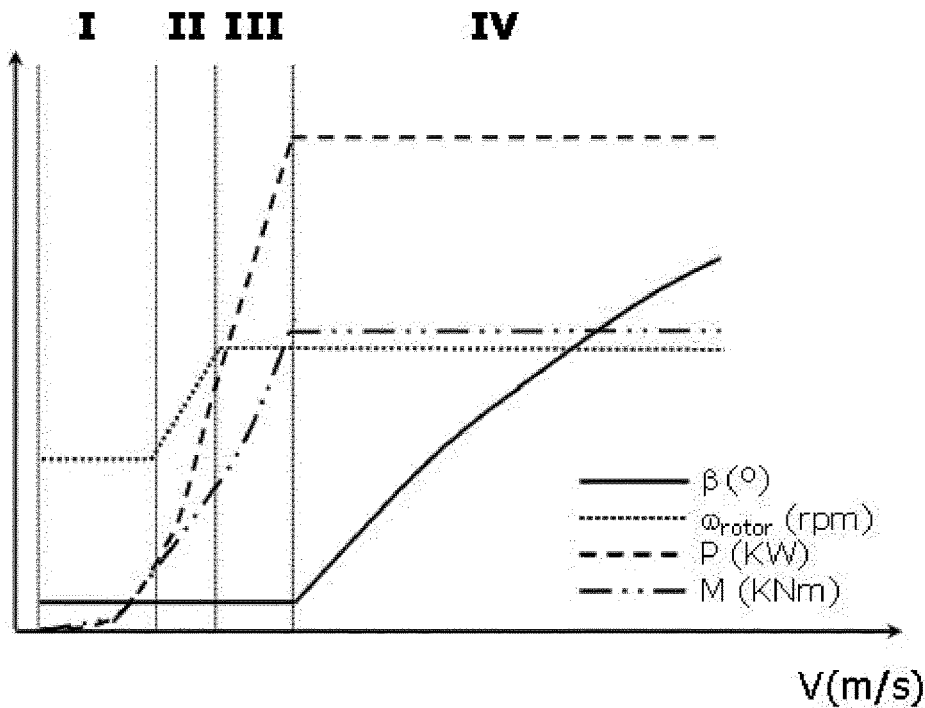
FIG. 1 illustrates a typical power curve of a wind turbine.
Figure 2A:
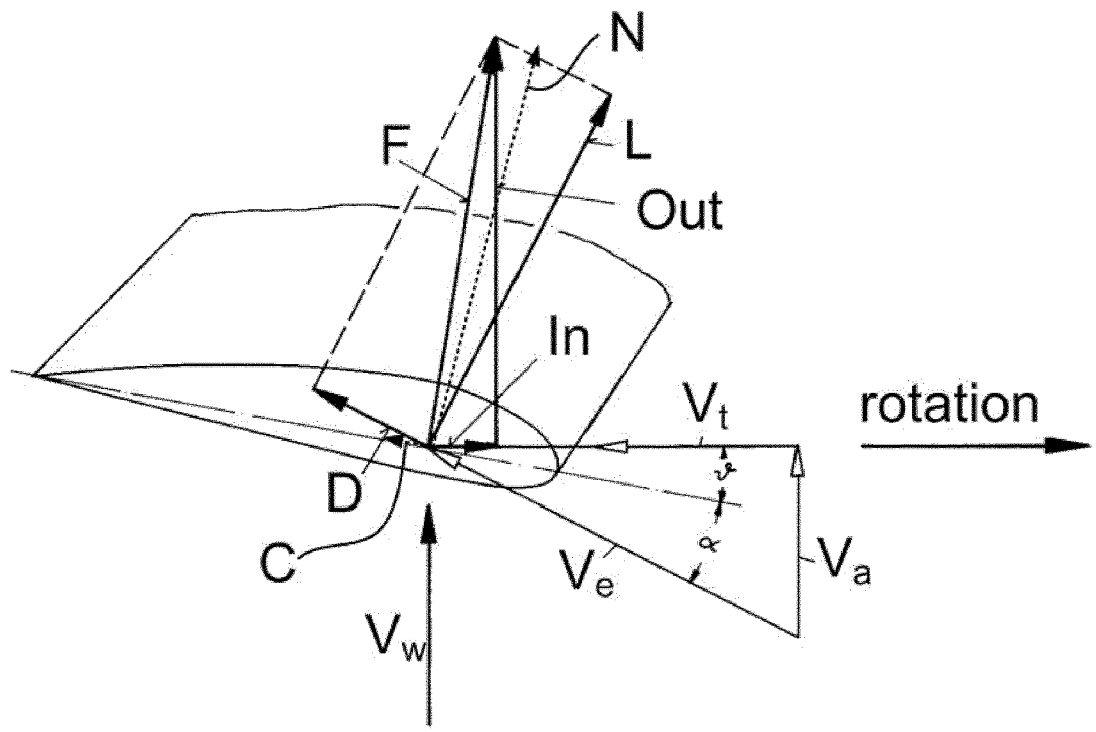
FIGS. 2a-2c illustrate aerodynamics of wind turbine blades and aerodynamic profiles in general.
Figure 2B:
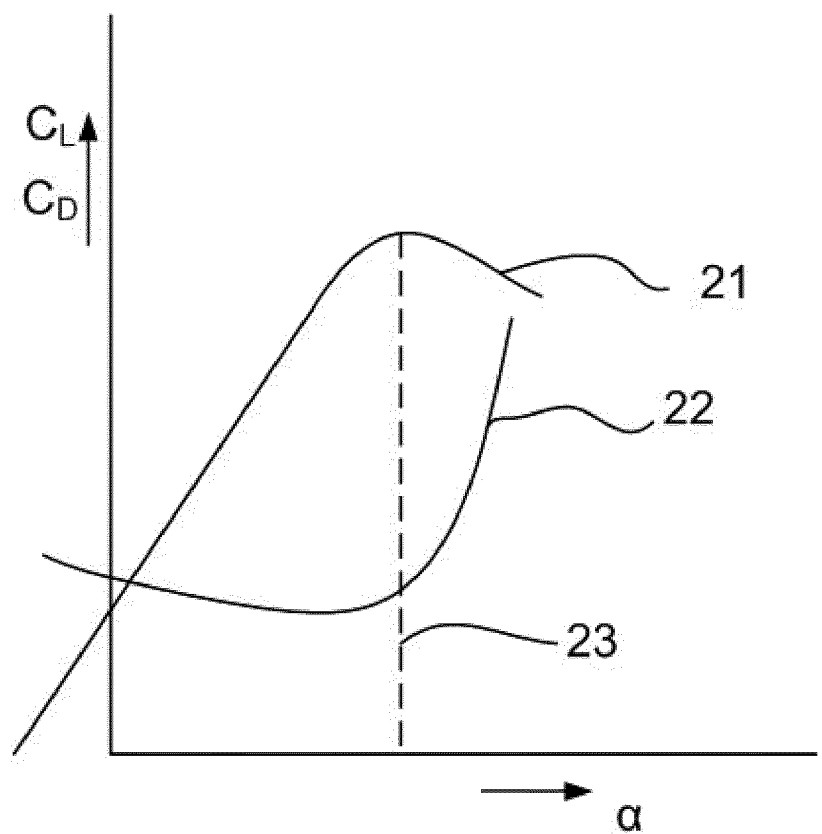
Figure 2C:
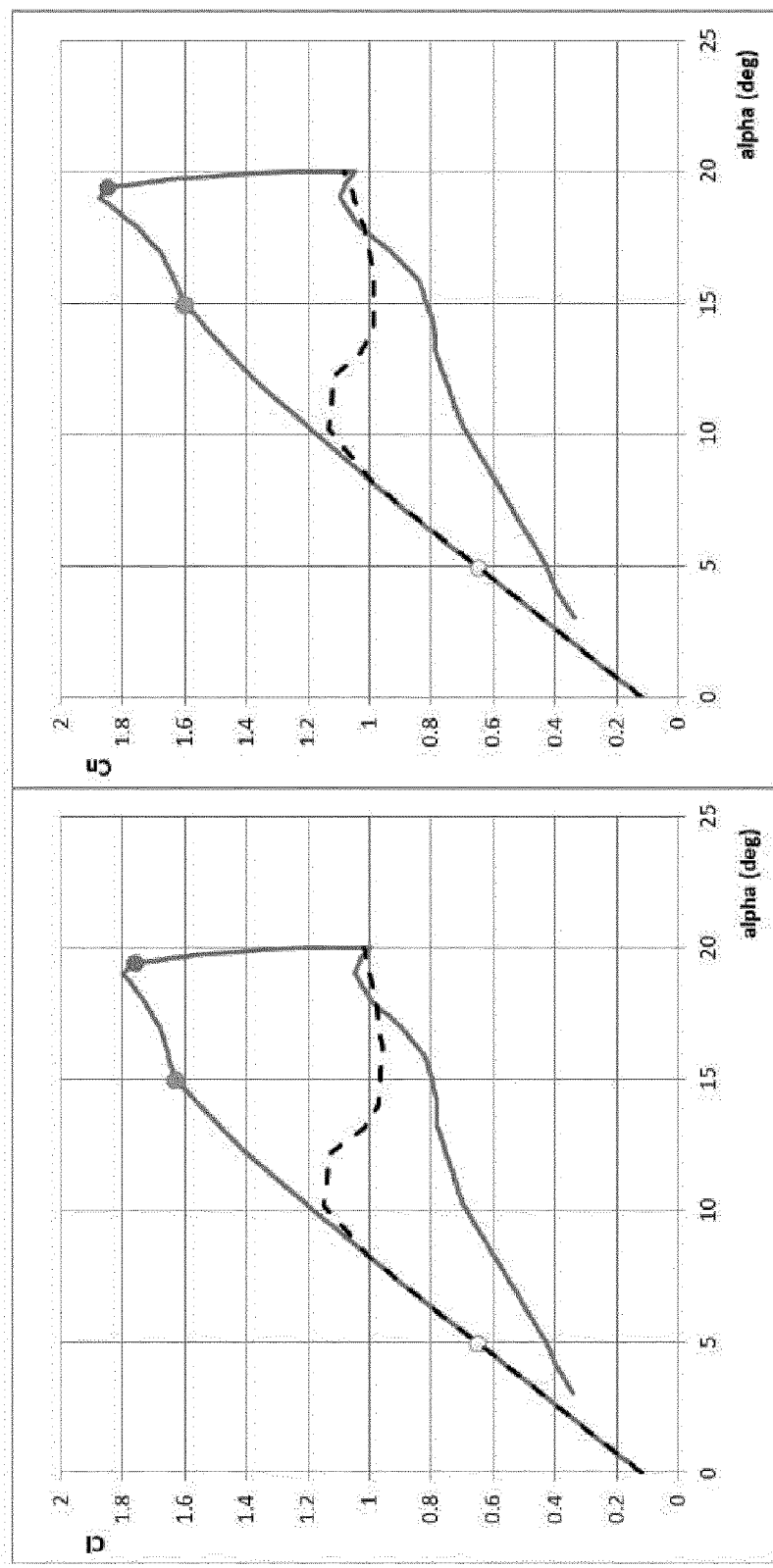
Figure 3A:
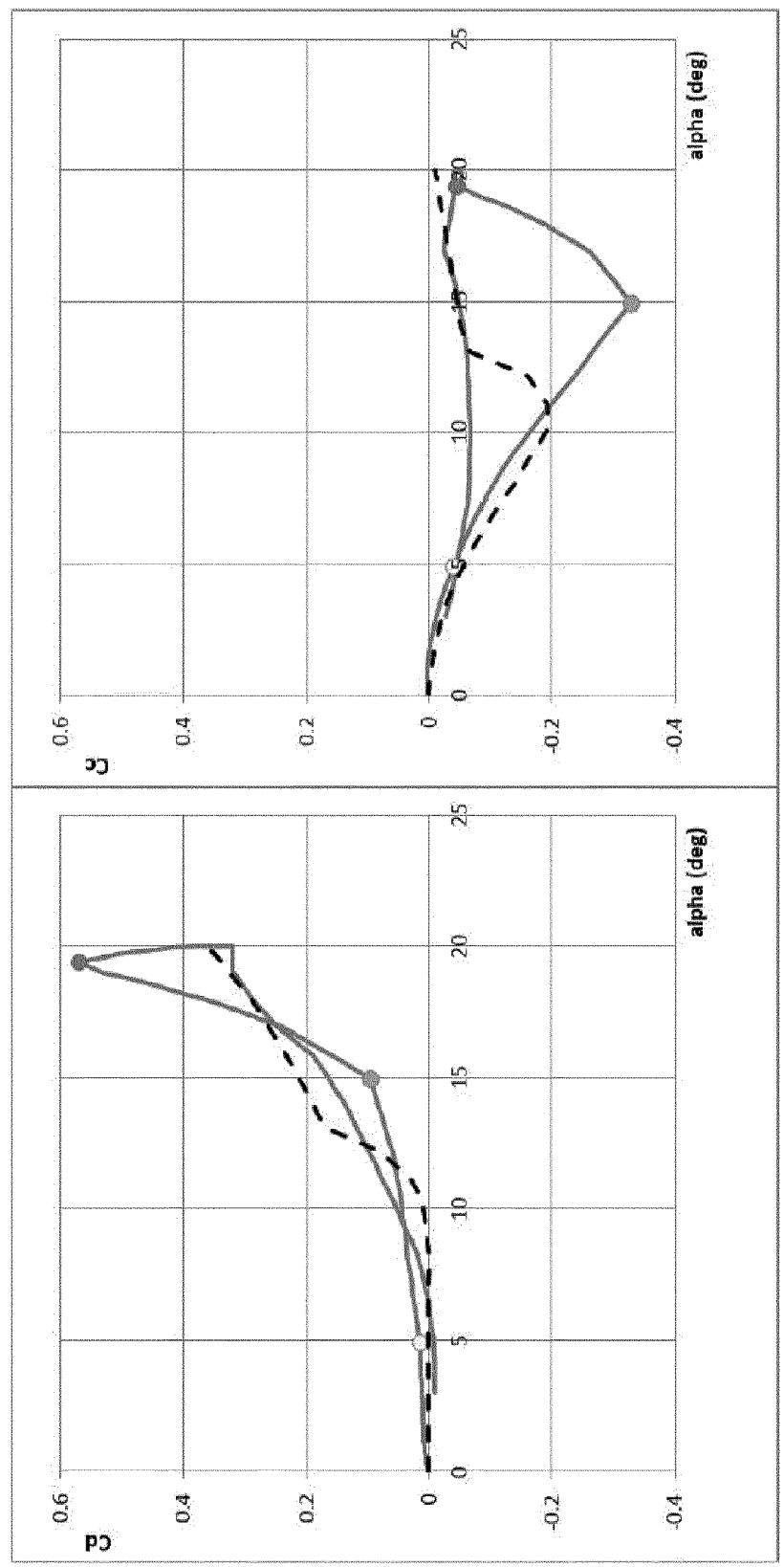
FIG. 3a illustrates schematically the curves of drag coefficient and coefficient of loads in the chordal plane in static and dynamic conditions.

The way in which stall is avoided by the blade according to this aspect may be further explained with reference to FIGS. 3a and 3b. FIG. 3a illustrates schematically the curves of $C_d$ and $C_c$ in static conditions (in interrupted lines) and in dynamic conditions (in continuous lines). In dynamic conditions, the drag increases quite rapidly before stall and drops off. The loads in the chordal plane, represented by coefficient $C_c$ show a peak in the negative direction before stall occurs. This peak is significantly more pronounced under dynamic conditions than under static conditions. This negative peak means that the blade experiences a forward load.

Figure 3B:
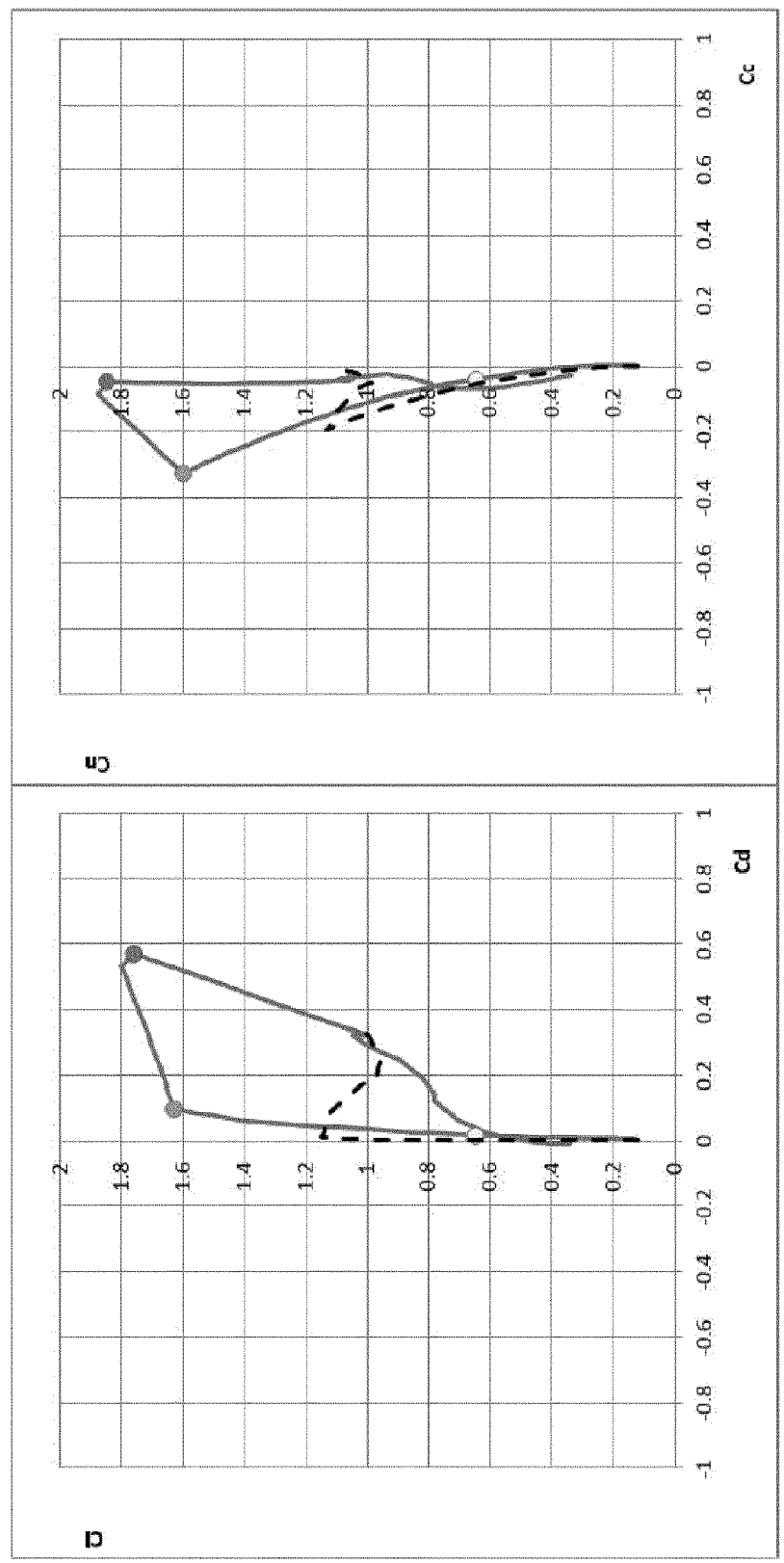
FIG. 3b shows the decomposition into loads in the chordal plane and perpendicular to the chordal plane, and lift and drag polar curve.

Another way of looking at the behaviour of blade sections is by looking at the lift and drag polar curve (represented on the left hand side of FIG. 3b). Again, the static behaviour is represented by the interrupted line, whereas the dynamic behaviour (unsteady aerodynamics) is represented by the continuous line. On the right hand side of FIG. 3b, the decomposition into loads in the chordal plane C and perpendicular to the chordal plane N is used rather than lift L and drag D. The negative peak in the loads in the chordal plane (negative $C_c$) mentioned earlier can be seen again quite clearly in this figure.

Examples of blades according to the present disclosure are based on using the pronounced negative peak of loads in the chordal plane before stall occurs. The aerodynamic profile (skin of the blade) is thus pulled forwards with respect to the internal support structure before stall occurs. The elastic connection 130 between the internal support structure 120 and the airfoil structure 110 can ensure that this forward pull is translated into a local pitch movement of the blade section. The local angle of attack may thus be reduced and stall may be avoided or the negative effects of stall may at least be reduced. This is carried out without any active control of the blade 100.

Within the inner space 115 defined inside the internal support structure 120 a suitable biasing mechanism 160 is provided. The biasing mechanism 160 acts between the airfoil structure 110 and the internal support structure 120. In the example shown in FIGS. 4a and 4c, the biasing mechanism 160 comprises a flexible foam surrounding the internal support structure 120. This flexible foam is fixed to the inner side of the airfoil structure 110 or it may be fitted between walls attached to of being part of the inner side of the airfoil structure 110.

In the example shown in FIG. 4b, the biasing mechanism 160 comprises a number of springs arranged between the upper and lower sides of the internal support structure 120 and the upper and lower internal sides of the airfoil structure 110, respectively.

In the example shown in FIG. 4c the biasing mechanism 160 comprises a flexible foam surrounding the internal support structure 120 and at least one elastic support element, such as a plate or spring, arranged between the lower external side of the internal support structure 120 and the lower internal side of the airfoil structure 110. In this particular example, the foam-spring connection between the airfoil structure 110 and the internal support structure 120 itself acts as an elastic hinge connection. Both in this case and in the example shown in FIG. 4a, the flexible foam is partially surrounding the internal support structure 120, although the foam could also be arranged completely surrounding the internal support structure 120. In any case, the flexible foam is arranged such that the airfoil structure 110 can be passively pitched relative to the internal support structure 120 according to the aerodynamic pressure distribution present at different locations of the blade 100.

The blade 100 can be divided into sections along its length. A number of biasing mechanisms 160 having the same or different properties may be provided in said blade sections such that each can be resiliently twisted degrees locally by the action of the wind at an angle, for example, of the order of 1-2.

Although only a number of particular embodiments and examples of the wind turbine blade have been disclosed herein, it will be understood by those skilled in the art that other alternative embodiments and/or uses and obvious modifications and equivalents thereof are possible. Furthermore, the present disclosure covers all possible combinations of the particular embodiments described. Thus, the scope of the present disclosure should not be limited by particular embodiments, but should be determined only by a fair reading of the claims that follow.

The invention claimed is:

1. A wind turbine blade comprising:
an airfoil structure comprising an airfoil shape;
an internal support structure arranged spanwise along a length of the blade and within the airfoil structure; and
an elastic hinge connection joining a portion of an inner surface of the airfoil structure with a portion of the internal support structure,
wherein the elastic hinge connection is adapted to cause the airfoil structure to passively pitch relative to the internal support structure around the position of the elastic hinge connection according to an aerodynamic pressure distribution at different locations of the blade section; and
wherein the elastic hinge connection comprises a single hinged connection between the airfoil structure and the internal support structure, the single hinged connection comprising a first connecting portion that is fixed to or is part of an inner surface of a pressure side of the airfoil structure, and a second connecting portion that is fixed to or part of a corresponding lower portion of an outer surface of the internal support structure, said single first and single second connecting portions being hinged to each other such that they are capable to pivot with respect to each other.

2. The wind turbine of claim 1, wherein the single hinged connection comprises a ball joint.

3. The wind turbine blade of claim 1, wherein the single hinged connection is placed at a location within a cross-section of the airfoil structure such that the aerodynamic moment of the internal support structure is zero.

4. The wind turbine blade of claim 1, wherein at least one of a plurality of biasing mechanisms is arranged between the airfoil structure and the internal support structure.

5. The wind turbine blade of claim 4, wherein each of the plurality of biasing mechanisms is comprised of a flexible foam.

6. The wind turbine blade of claim 4, wherein a plurality of the biasing mechanisms are provided along the length of the blade in different blade sections, wherein the plurality of biasing mechanisms have different properties in the different blade sections.

7. The wind turbine blade of claim 1, wherein the internal support structure is a beam.

8. The wind turbine blade of claim 1, wherein the internal support structure is a spar-box.

* * * * *